June 3, 1924.
J. G. VINCENT
HYDROCARBON MOTOR
Filed Feb. 7, 1920
1,496,397
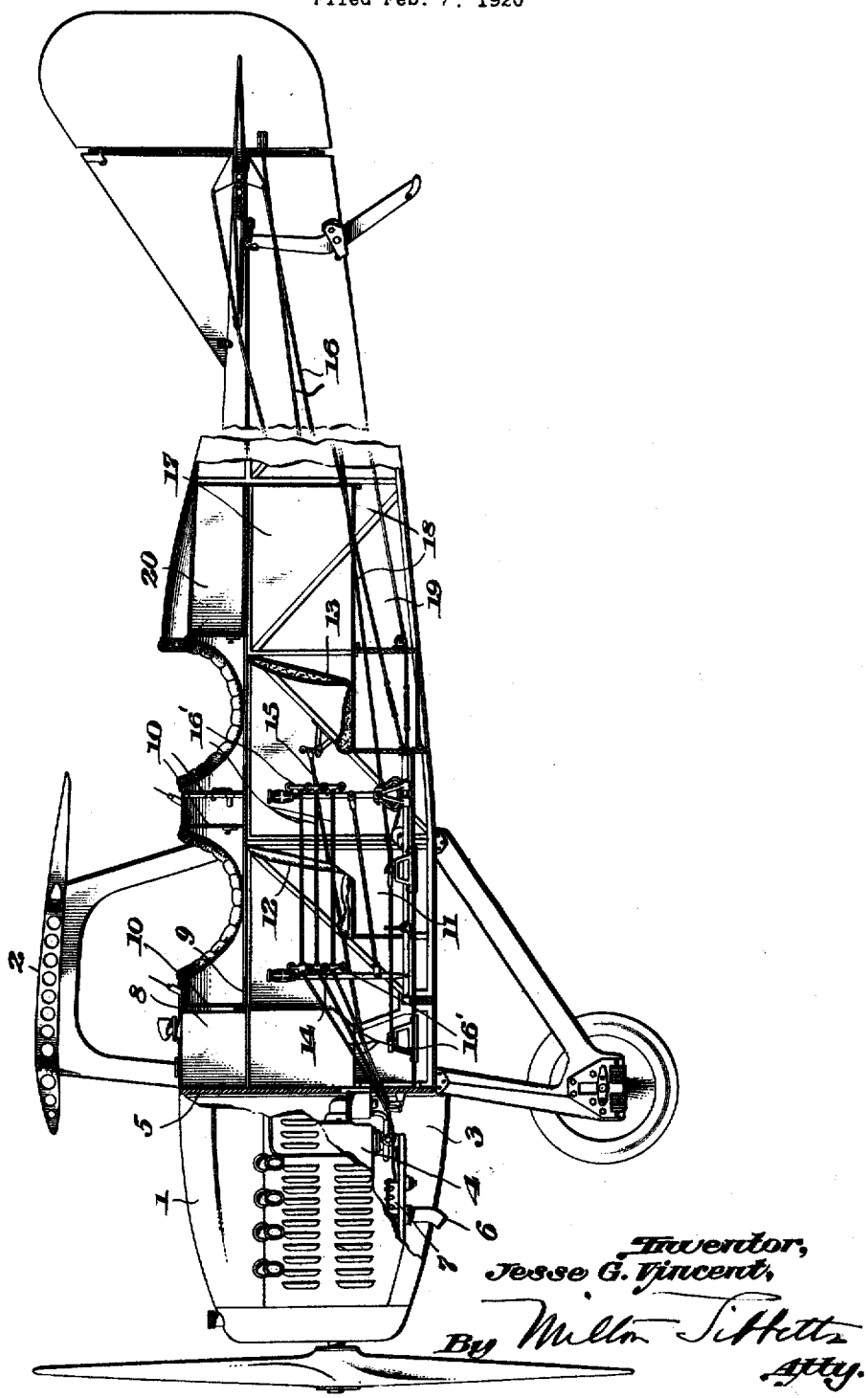
Inventor,
Jesse G. Vincent,
By Milton Tibbitts
Atty.

Patented June 3, 1924.

1,496,397

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Application filed February 7, 1920. Serial No. 357,021.

*To all whom it may concern:*

Be it known that I, JESSE G. VINCENT, a citizen of the United States, and resident of Detroit, Wayne County, State of Michigan, have invented certain new and useful Improvements in Hydrocarbon Motors, of which the following is a specification.

This invention relates to aircraft and particularly to the construction of the nacelles thereof.

The objects of the invention are to provide a convenient arrangement of a nacellé for the accommodation of passengers, a motor, equipment and baggage within the body of the nacellé, and to protect the fuselage against fire.

With these objects in view, the invention is embodied in preferable form in the construction hereinafter described and illustrated in the accompanying drawing, in which:

The view shown is a vertical section, partly in side elevation, of an airplane containing my improvements.

Referring to the drawing, the nacellé comprises a continuous closed body, the exterior shell 1 of which is supported on the planes of the aircraft of which the upper plane 2 is indicated. The nacellé is divided interiorly into compartments arranged longitudinally thereof.

The front compartment 3 is adapted to contain the motor 4 and its accessory parts. The engine is thus housed in and separated from the other compartments of the nacellé and the passengers protected from grease and gases blowing therefrom, by means of a partition 5 and the exterior shell 1. The air intake 6 of the carburetor 7 of the motor projects through the bottom of the shell or fuselage, and damage from fire is thus prevented.

Immediately to the rear of the partition 5 is located a fuel tank 8 which is supported on said partition and on longitudinal bracing members 9 which in turn are connected to uprights 10 extending to the shell of the nacellé. The fuel tank is located in a large central compartment 11 within which is also mounted a forward seat 12 and a rear seat 13. In this compartment and in front of each of the said seats are located respectively control members 14 and 15 permitting dual operation of the aileron and elevator connecting elements such as 16 which also extend into and through said compartment 11. Other controls 16' for the throttle, spark and altitude are provided.

The back of the seat 13 forms a partition which constitutes one wall of a compartment 17, the bottom 18 of which constitutes the upper wall for a lower compartment 19. The upper wall or ceiling of the compartment 17 also constitutes the bottom of a compartment 20 vertically disposed with respect to chambers 17 and 19. The two compartments 17 and 20 may serve for the carrying of equipment and baggage.

Having thus described my invention what I claim is:

In an aircraft, the combination of a nacellé comprising a front closed compartment, a seat compartment, and a plurality of vertically arranged compartments rearwardly of said seat compartment, a motor in said front compartment having its carburetor intake extending through a wall of said closed compartment, and a fuel supply reservoir mounted on said aircraft rearwardly of said closed compartment.

In testimony whereof I affix my signature.

JESSE G. VINCENT.